United States Patent
Pope et al.

(10) Patent No.: US 9,445,545 B2
(45) Date of Patent: Sep. 20, 2016

(54) NUT GATHERER AND METHOD OF CONSTRUCTING SAME

(71) Applicants: Stephen M. Pope, Lenexa, KS (US); Huang-Mo Hsieh, Puyan Township (TW); Huang-Lung Lin, Puyan Township (TW)

(72) Inventors: Stephen M. Pope, Lenexa, KS (US); Huang-Mo Hsieh, Puyan Township (TW); Huang-Lung Lin, Puyan Township (TW)

(73) Assignee: FAULTLESS STARCH/BON AMI COMPANY, Kansas City, MO (US)

( * ) Notice: Subject to any disclaimer, the term of this patent is extended or adjusted under 35 U.S.C. 154(b) by 0 days.

(21) Appl. No.: 13/790,772

(22) Filed: Mar. 8, 2013

(65) Prior Publication Data

US 2014/0161574 A1   Jun. 12, 2014

Related U.S. Application Data

(63) Continuation-in-part of application No. 13/463,465, filed on May 3, 2012, now abandoned.

(60) Provisional application No. 61/482,012, filed on May 3, 2011.

(51) Int. Cl.
*A01D 51/00* (2006.01)
*A01D 46/00* (2006.01)
*B23P 19/04* (2006.01)
*B25J 15/00* (2006.01)

(52) U.S. Cl.
CPC ............. *A01D 51/002* (2013.01); *B23P 19/04* (2013.01); *B25J 15/0019* (2013.01); *Y10T 29/49826* (2015.01)

(58) Field of Classification Search
CPC .... A01D 51/00; A01D 51/002; A01D 46/00; A01D 46/247

USPC ......................................... 56/328.1; 294/19.2
See application file for complete search history.

(56) References Cited

U.S. PATENT DOCUMENTS

| | | | | |
|---|---|---|---|---|
| 1,970,616 | A * | 8/1934 | Montan | 56/400.17 |
| 2,315,021 | A * | 3/1943 | Schmidt et al. | 56/400.17 |
| 3,057,145 | A * | 10/1962 | Van Der Lely | 56/377 |
| 3,215,293 | A * | 11/1965 | Kelly et al. | 414/440 |
| 3,227,298 | A * | 1/1966 | Shoemaker | 414/440 |
| 3,604,190 | A * | 9/1971 | Wray | 56/328.1 |
| 3,707,835 | A * | 1/1973 | McNally et al. | 56/400.01 |
| 3,804,449 | A * | 4/1974 | Falitz | 294/19.2 |
| 3,902,749 | A * | 9/1975 | Falitz | 294/19.2 |
| 3,926,465 | A * | 12/1975 | Hoagland et al. | 294/19.2 |
| D323,831 | S * | 2/1992 | Hollis | D15/10 |
| 5,370,558 | A * | 12/1994 | Scherer et al. | 439/719 |
| D424,144 | S * | 5/2000 | Sullivan | D21/721 |
| 6,422,621 | B1 * | 7/2002 | Tandlich | 294/19.2 |
| 6,460,249 | B1 * | 10/2002 | Holt, Jr. | 29/891 |
| 6,481,768 | B1 * | 11/2002 | Fu | 294/19.2 |
| 6,883,844 | B2 * | 4/2005 | Carr | 294/19.2 |
| 2011/0067375 | A1 * | 3/2011 | Madaffer | 56/400.16 |

* cited by examiner

*Primary Examiner* — Robert Pezzuto
*Assistant Examiner* — Joan D Misa
(74) *Attorney, Agent, or Firm* — Stinson Leonard Street LLP

(57) ABSTRACT

A nut gatherer device includes a cage formed by a plurality of wires. Each of the wires has a bowed middle segment and two straight end portions. Opposite end portions of the wires are secured within opposed hubs, each hub including first and second annular sets of spaced teeth, with the end portions of the wires secured in the radially-aligned spaces. A retainer affixed to the hub secures the wires between. A compressible washer between the wires and the retainer provides further securement and vibration dampening. An axle aperture in the hubs allows the cage to be rotatably attached to a handle. In use, the wire cage is rolled on the ground into contact with a bulky object, such as a nut, so that the object forces the wires to separate and permit the nut to pass into the cage where it is retained until emptying.

16 Claims, 2 Drawing Sheets

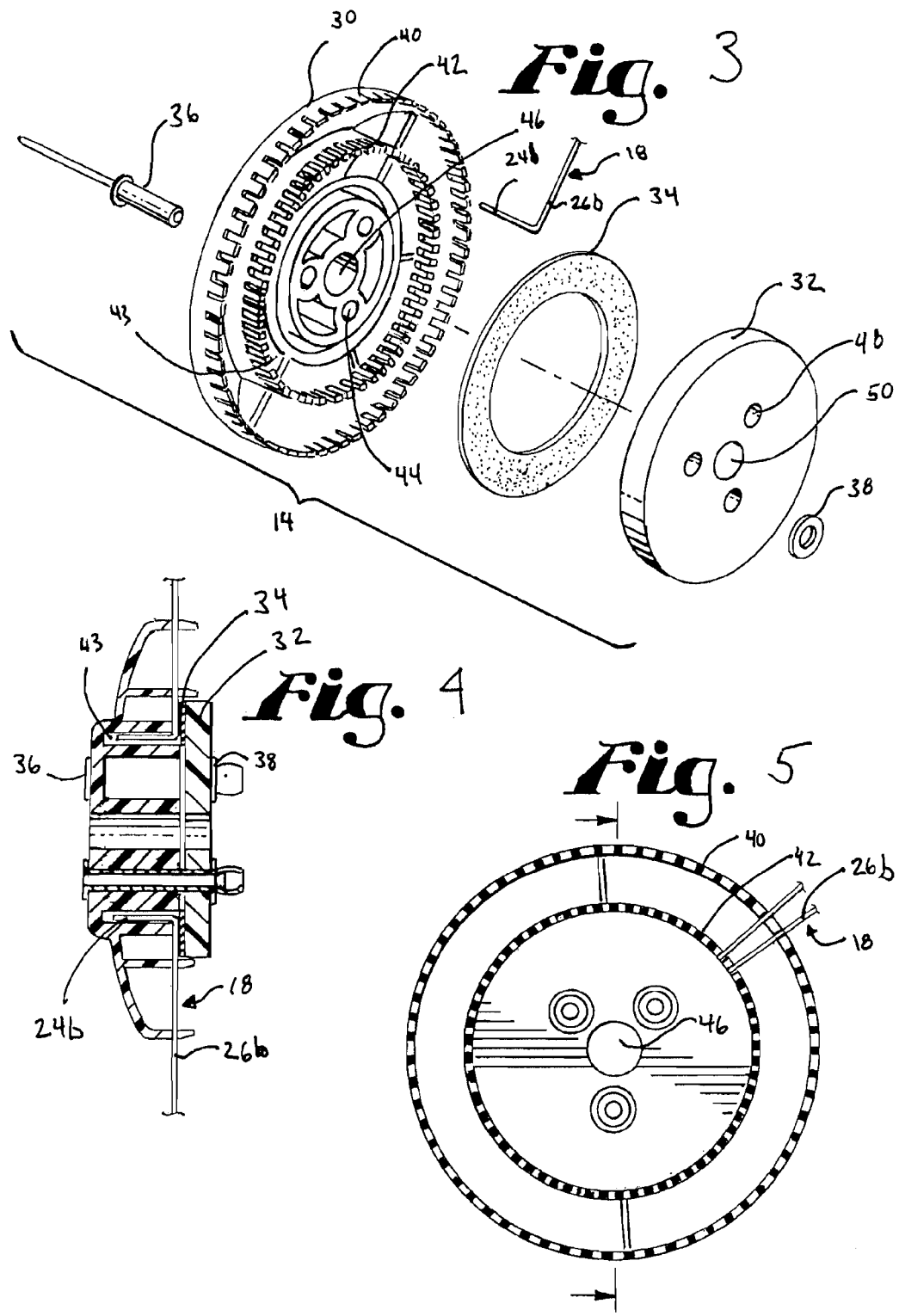

US 9,445,545 B2

NUT GATHERER AND METHOD OF CONSTRUCTING SAME

CROSS-REFERENCE TO RELATED APPLICATIONS

This application is a Continuation-in-Part of U.S. patent application Ser. No. 13/463,465, filed on May 3, 2012, which claims priority to U.S. Provisional Application Ser. No. 61/482,012, filed on May 3, 2011, each of which is incorporated herein by reference in its entirety.

STATEMENT REGARDING FEDERALLY SPONSORED RESEARCH OR DEVELOPMENT

Not applicable.

BACKGROUND OF THE INVENTION

Gardening and yard maintenance require a variety of tools. Many of these tools are designed to efficiently remove debris or yard waste. Rakes and brooms are typically used to maneuver yard waste such as leaves, grass clippings and branches into piles for removal. Some bulky items, such as nuts and pine cones, are not easily corralled using rakes or brooms because they pass through the tines of the tool, are too bulky to be swept, or roll away. Yet these items are precisely the sort of yard debris that most gardeners prefer to clear away as they do not decompose quickly, can cause damage to lawn mowers and create a slipping hazard for people desiring to use the space for recreation or leisure. Harvesting devices for these bulky items are known in the art, for example in the form of a rotating wire drum attached at the end of a handle. Known devices, however, often do not adequately secure the wires of the drum, resulting in a drum that is not durable and generally difficult to construct.

BRIEF SUMMARY OF THE INVENTION

The present invention is directed to a device for gathering bulky objects and other debris, including but not limited to pecans, acorns, walnuts, butternuts, hickory nuts, chestnuts, filberts, gum balls, seeds, fruit, small balls, pine cones, seed heads, shotgun shells and reusable paintballs. In one exemplary embodiment, the device includes an elongated wire cage with a hub positioned at either end. Each wire preferably comprises a bowed middle segment, with opposed straight end portions of each wire projecting inwardly, towards each other. Each hub preferably comprises first and second annular sets of spaced teeth, with the first set located around the periphery of the hub, and the second set being spaced circumferentially inwardly from the first set. The open spaces between the teeth in the first set are radially aligned with the open spaces between the teeth in the second set so that the wires are received in and extend between the corresponding spaces in the first and second sets of teeth. A fastener engages with and maintains a retainer in position to secure the wires into place in the spaces between the teeth. A plurality of wires secured between opposite hubs forms an elongated wire cage. In alternative exemplary embodiments, the device includes a compressible washer positioned between the retainer and the wires to further secure the wires, dampen vibration of the secured wires, and prevent movement or dislodging of the wires.

A handle is rotatably mounted to the hubs such that the cage can freely spin between the handle ends. An extension is preferably attached to the handle, which allows a user to roll the wire cage along the ground or other surface to be cleared from a standing position. As the wire cage contacts items, such as nuts and other bulky debris, the wires flex to permit the items to enter the interior of the cage where they are trapped when the wires return to their original position.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 3 is an exploded view of a hub used in the construction of the nut gatherer of FIG. 1.

FIG. 4 is a cross-sectional view of the hub of FIG. 3.

FIG. 5 is an enlarged plan view of a hub disc.

DETAILED DESCRIPTION OF EXEMPLARY EMBODIMENTS

Figure 1:
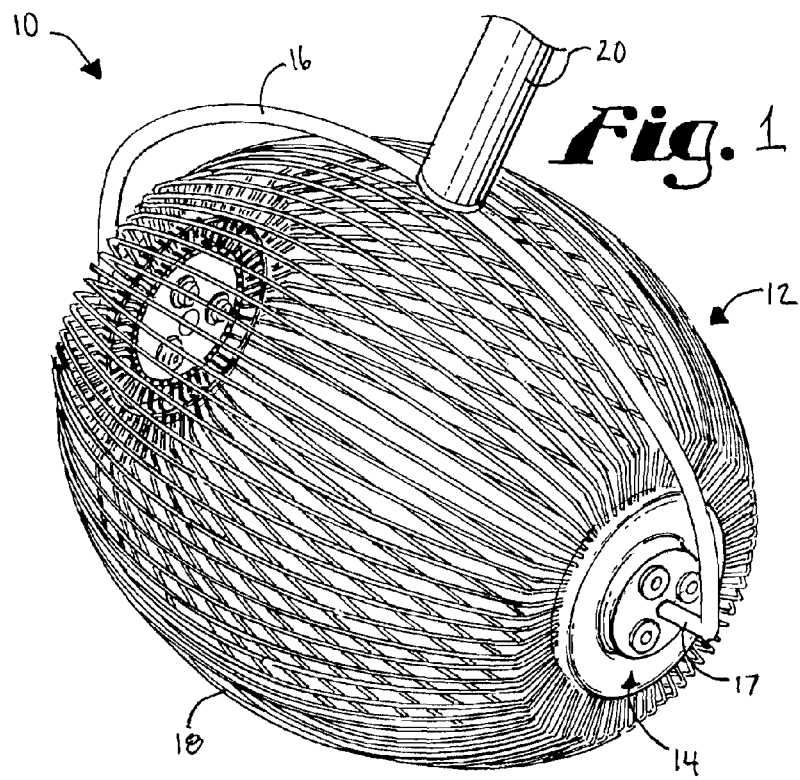
FIG. 1 is a perspective view of an exemplary embodiment of the nut gatherer of the present invention.

With reference to FIG. 1, a nut gatherer in accordance with an exemplary embodiment of the present invention is shown and generally designated by reference number 10. Nut gatherer 10 includes an elongated wire cage 12, two hubs 14 positioned at opposite ends of the cage, with a handle 16 rotatably mounted to each hub. Wire cage 12 is formed of a plurality of flexible wires 18 secured at both ends by hubs 14 to form cage 12, as will be explained in more detail below. Handle 16 is rotatably mounted to hubs 14 via axle portions 17 such that cage 12 spins freely in either direction between the ends of the handle. Handle 16 is also configured to be removably attached to handle extension 20.

Figure 2:
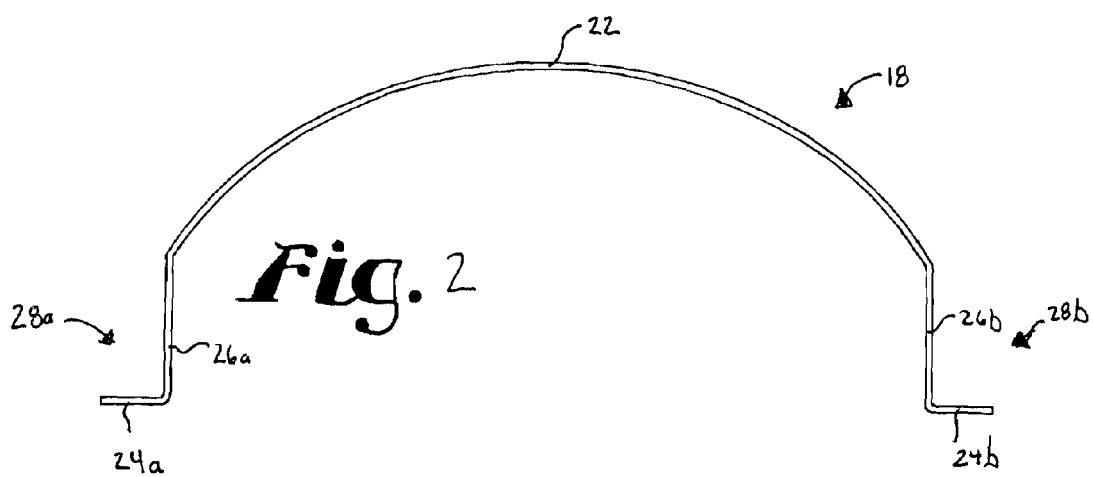
FIG. 2 is a side view of a wire used in the construction of the nut gatherer of FIG. 1.

As shown in FIG. 2, each wire 18 has a bowed middle segment 22 forming a convex exterior surface and a concave interior surface. First and second straight leg portions 26a, 26b extend down from opposite ends of the bowed middle segment to first and second straight end portions 24a, 24b, respectively, each straight end portion extending outwardly at opposite ends of the wire to form an L-shaped end portion 28a, 28b at each end of the wire.

In a preferred embodiment, each wire is approximately eight inches in overall length, with the apex of the bowed portion extending approximately three and a half inches from the axis between the two straight end portions such that a cage, comprised of approximately sixty wires of similar size and shape, measures approximately eight inches long and seven inches in diameter at its widest point. The wire is preferably made of a metal material that is sufficiently rigid to hold the basic shape described above but sufficiently flexible and resilient that it will flex away from a bulky object upon contact and return to its original position when the contact with the bulky object is terminated (e.g., the bulky object has been collected into the cage).

With reference to FIG. 3, an exploded view of a hub is shown. Each hub 14 comprises a hub disc 30, a retainer 32, a washer 34, and a fastener 36 and fastener cap 38. Hub disc 30 comprises first 40 and second 42 annular sets of spaced teeth, concentrically arranged on the inwardly-oriented surface of the hub disc. The first set of spaced teeth 40 is located around the periphery of the hub disc, the second set of spaced teeth 42 is positioned circumferentially inwardly (towards the axis of the hub) from the first set of teeth so that the open spaces between the teeth in the first set of teeth are radially aligned with the open spaces between the teeth in the second set of teeth. A recessed area 43 located inwardly of the second set of teeth is configured to accept the straight end portions 24a, 24b of the wires so that the ends of the wires are covered and protected by the disc hub. Three fastener apertures 44 are defined inwardly of the second set of spaced teeth, with a handle aperture 46 defined around the center axis of the hub disc.

Retainer 32 is generally cylindrical in shape, with flat inner and outer surfaces, the flat inner surface configured to conform to the annulus defined by the inward-most surfaces of the second set of spaced teeth. Retainer 32 includes three fastener apertures 48 and a handle aperture 50 defined therethrough, those apertures being similar in size and positioning to the corresponding apertures in the hub disc 30. Retainer 32 is preferably sized to cover at least the second set of spaced teeth in hub disc 30.

Washer 34 is positioned between the hub disc 30 and the retainer 32 and is captured therebetween with fastener 36 passing through the fastener apertures in the hub disc and retainer, with fastener cap 38 affixing the retainer in position. Washer 34 is preferably made of a compressible material, and is preferably sized to cover the annulus formed by the inward-most surfaces of the second set of spaced teeth.

Fastener 36 and fastener cap 38 are preferably a rivet and rivet cap, respectively, most preferably three rivets and three rivet caps are used to affix the retainer to the hub disc. Alternatively, other fasteners may be used, such as screws or nuts and bolts.

Looking to FIG. 5, and as described above, hub disc 30 comprises first 40 and second 42 annular sets of spaced teeth, concentrically arranged such that the open spaces between the teeth in the first set of teeth are radially aligned with the open spaces between the teeth in the second set of teeth. As can be seen in FIG. 5, these radially-aligned spaces are configured to receive the straight leg portion 26b of a wire 18 extending between the spaces in the first and second set of teeth, with the depth of the spaces between the teeth preferably sufficient to accept approximately the entire diameter of the wire so that the wire is slightly recessed into the space. Similarly, the spacing between the teeth is preferably sufficient to accept approximately the entire diameter of the wire. Thus, the straight leg portion of wire 18 is tightly secured between both the inner teeth and the outer teeth of hub disc 30.

As shown in FIG. 4, with wires 18 positioned as described above, with the straight leg portion 26b extending between spaces in the first and second set of teeth, the straight end portion 24b of the wire extends outwardly, into the recessed area 43 of the hub disc. Washer 34 is positioned over a portion of the straight leg portion 26b of the wire, against the annulus formed by the inward-most surfaces of the second set of teeth. The washer is held in position by retainer 32, the retainer is affixed to the hub disc by fastener 36 and fastener cap 38. Preferably, washer 34 is made of a compressible material so that when the retainer is positioned and fastened tightly to the hub disc, the washer compresses into the spaces between the teeth to contact the wire. The compressed material of the washer against the wire acts to secure the wire in place, and further acts to dampen vibration and movement of the wire.

Looking back to FIG. 1 in conjunction with FIGS. 3-5, the handle 16 includes two opposed axle portions 17 sized to fit into the handle apertures 46, 50 in the hub disc and retainer, respectively. The axle portions are preferably slightly smaller in diameter than the handle apertures so that the hub/retainer rotates freely on the axle.

To construct a nut gatherer device of the present invention, multiple pieces of wire 18 are formed, each having a bowed middle portion 22, with straight leg portions 26a, 26b and straight end portions 24a, 24b. Two hub discs 30, each having first and second annular sets of spaced teeth are positioned and each wire is loaded with wires, each wire being positioned with its straight leg portion 26a, 26b extending between the radially-aligned spaces in the teeth at the corresponding hub, with the straight end portion 24a, 24b of each wire extending into the recessed area 43 of the corresponding hub. With all of the wires in place, a compressible washer 34 is positioned on the annulus formed by the surfaces of the second set of spaced teeth, and a retainer 32 is affixed to the hub with a fastener 36 and fastener cap 38 to tightly secure the wires into place between the hub disc and the retainer. The wires thus form a cage that is rotatably attached to a handle 16 as described above. The radially spaced teeth and compressible washer secure the wires into position and dampen vibration of the wires, preventing them from becoming dislodged during use of the device.

In use, a handle extension 20 is used to push and pull the nut gatherer device 10 along a surface to collect bulky objects. As the device 10 is pushed or pulled along a surface with slight downward pressure applied by the user, cage 12 rotates. When a pair of wires 18 is pressed onto a bulky item, such as a nut, acorn, or other object, the object forces wires 18 to temporarily spread and permit the object to enter the interior of cage 12. Once the object has entered the interior of cage 12, wires 18 return to their original position such that they will not permit the object to pass back out of the drum. Nut gatherer device 10 can be operated in a forward or backward motion, as cage 12 freely spins in either direction on the axle portions 17 of handle 16.

Preferably, the number of wires used in constructing the cage is approximately sixty, with a preferably cage size being approximately eight inches long and seven inches in diameter. In alternative embodiments, more or fewer wires may be used to form cage 12, and the size of the cage may vary. For example, the number of wires may depend on the size of the target bulky objects, if the target object debris is small (such as an acorn), then more wires may be used so that the wires are spaced more closely together, and if the target bulky object is larger (such as a walnut), then fewer wires are needed and the spacing between them can be greater. The bowed middle segment 22 of wires 18 may also be bowed to a greater or lesser degree. The more the wires are bowed the more disc-shaped cage 12 becomes, which means less surface area is in contact with the ground at any one time. The less the wires are bowed, the more elongated the cage 12 becomes, which means more surface area is in contact with the ground at any one time. Although metal wires are described with reference to the preferred embodiment, plastic material that is sufficiently rigid yet flexible and resilient may also be used.

In other alternative embodiment, the straight-end portions of the wires extend inwardly, rather than outwardly. In further alternative embodiments, the spaced teeth may be defined by spaced holes in the hub disc. In yet another alternative embodiment, the ends of the wires include only a single straight leg extending downward from the bowed middle portion. In this embodiment, no recessed area need be provided in the hub disc for the straight end portions. The straight leg simply extends between the radially-aligned spaces between the first and second set of a spaced teeth.

While specific embodiments have been shown and discussed, various modifications may of course be made, and the invention is not limited to the specific forms or arrangement of parts and steps described herein, except insofar as such limitations are included in the following claims. For example, the end portions of the wires may be curved to form the hooked ends instead of bent at angles and any method known in the art for coupling the hub disc to the hubcap may be used instead of a nut and a bolt, such as a screw or bolt and a threaded socket.

What is claimed and desired to be secured by Letters Patent is as follows:

1. A device for collecting bulky objects from the ground comprising:
    a cage formed from a plurality of circumferentially spaced wires, each of said wires having a bowed middle segment and opposed straight end portions;
    a pair of hubs for receiving said opposed end portions, each of said hubs having an outer surface and an inner surface,
    each of said hubs comprising first and second annular sets of spaced teeth, said first set being located around the periphery of said hub and said second set being spaced circumferentially inwardly from said first set of teeth, the open spaces between said teeth in said first set being radially aligned with the open spaces between said teeth in said second set whereby said wires are received in said open spaces between said first and second sets of teeth;
    a retainer adapted to hold said wires in position between said teeth; and
    at least one fastener engaging said retainer to maintain said retainer in a fixed position.

2. The device of claim 1, further comprising a washer positioned between said hub and said retainer.

3. The device of claim 2, wherein is included a plurality of said fasteners.

4. The device of claim 3, wherein said washer is compressible.

5. The device of claim 1, wherein said end portions project inwardly.

6. The device of claim 1, wherein said first and second sets of teeth project inwardly and said end portions project outwardly.

7. The device of claim 6, wherein is included a compressible washer positioned between said hub and said retainer.

8. The device of claim 7, wherein said second set of teeth presents an annulus which receives said washer.

9. The device of claim 1, wherein each of said wires includes a straight leg portion between said bowed portion and said end portion, said straight leg portions being received in said open spaces between said teeth.

10. The device of claim 9, wherein said straight leg portions present an angle of approximately 90° with said end portions.

11. A device for collecting bulky objects from the ground comprising:
    a cage formed from a plurality of circumferentially spaced wires, each of said wires having a bowed middle segment, first and second straight leg portions at opposite ends of said middle segment and opposed straight end portions extending from said straight leg portions;
    a pair of hubs for receiving said opposed end portions, each of said hubs having an outer surface and an inner surface,
    each of said hubs comprising first and second annular sets of spaced teeth, said first set being located around the periphery of said hub and said second set being spaced circumferentially inwardly from said first set of teeth, the open spaces between said teeth in said first set being radially aligned with the open spaces between said teeth in said second set whereby said wires are received in said open spaces between said first and second sets of teeth;
    each of said hubs further comprising a recessed area configured to receive said straight end portions of said wires;
    a retainer adapted to hold said wires in position between said teeth; and
    at least one fastener engaging said retainer to maintain same in a fixed position to said hub.

12. The device of claim 11, wherein each of said hubs further comprises an axial aperture to allow said device to be rotatably attached to a handle.

13. A method of making a nut gathering device, comprising:
    providing a plurality of wires;
    bending said wires to form a bowed middle segment and two straight end portions providing a pair of hubs, each comprising first and second annular sets of spaced teeth, said first set being located around the periphery of said hub and said second set being spaced circumferentially inwardly from said first set of teeth, the open spaces between said teeth in said first set being radially aligned with the open spaces between first and second;
    inserting opposing straight end portions of said wires into said radially-aligned spaces in said hubs; and
    affixing a retainer to each of said hubs to secure said wires within said spaces.

14. The method of claim 13, further comprising:
    placing a washer over said inserted wires between said hub and said retainer.

15. The method of claim 14, wherein said washer comprises a compressible material.

16. The method of claim 13, wherein said affixing step comprises attaching said retainer to said hub using a fastener.

* * * * *